US 6,697,274 B2

United States Patent
Bernet et al.

(10) Patent No.: US 6,697,274 B2
(45) Date of Patent: Feb. 24, 2004

(54) OPEN-LOOP AND CLOSED-LOOP CONTROL METHOD FOR A THREE-POINT CONVERTER WITH ACTIVE CLAMPED SWITCHES, AND APPARATUS FOR THIS PURPOSE

(75) Inventors: Steffen Bernet, Bammental (DE); Thomas Brückner, Berlin (DE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 10/388,022

(22) Filed: Mar. 13, 2003

(65) Prior Publication Data

US 2003/0165071 A1 Sep. 4, 2003

Related U.S. Application Data (63) Continuation of application No. PCT/EP01/10141, filed on Sep. 4, 2001.

(30) Foreign Application Priority Data

Sep. 13, 2000 (DE) .......................................... 100 45 208
Aug. 20, 2001 (DE) .......................................... 101 40 747

(51) Int. Cl.[7] ....................... H02M 7/5387; H02M 7/537
(52) U.S. Cl. .......................................... 363/132; 363/98
(58) Field of Search ................................ 363/131, 132, 363/95, 98, 97

(56) References Cited

U.S. PATENT DOCUMENTS 4,443,841 A * 4/1984 Mikami et al. ............... 363/41
5,638,266 A * 6/1997 Horie et al. ................. 363/132
5,801,936 A * 9/1998 Mori et al. .................. 363/132
6,480,403 B1 * 11/2002 Bijlenga ....................... 363/98

FOREIGN PATENT DOCUMENTS

DE 41 27 706 A1 3/1993 ............ H02M/1/08
GB 2 293 503 A 3/1996 ............ H02M/1/00

OTHER PUBLICATIONS

B. Kaku et al.: "Switching loss minimized space vector PWM method for IGBT three–level inverter", *IEE Proc.— Electr. Power Appl.*, vol. 144, No. 3, May 1997, pp. 182–190.

(List continued on next page.)

*Primary Examiner*—Bao Q. Vu
(74) *Attorney, Agent, or Firm*—Laurence A. Greenberg; Werner H. Stemer; Ralph E. Locher (57) ABSTRACT

An open-loop and closed-loop control method is proposed for a single-phase or polyphase three-point converter which is connected to a DC voltage intermediate circuit, having two series-connected main switches/inverse diodes between each DC voltage connection and each load connection. The common junction point of the two inner main switches forms the load connection. An active clamped switch with an inverse diode is connected between each common junction point of an inner main switch and an outer main switch and the center tap of the DC voltage intermediate circuit. As a result of which, two possible paths are formed for connecting a load connection to the center tap. Irrespective of the direction of the load current, at least one of the two active clamped switches (T5, T6) is connected to the center tap together with at least one inner main switch for connection of a load connection. The provides a circuit that can carry the current deliberately through the upper path, the lower path, or through both paths, to the center tap during a null state.

18 Claims, 4 Drawing Sheets

OTHER PUBLICATIONS

F. V. P. Robinson: "The Affect Of Thermal Performance on Device Current Utilisation", *Power Electronics Specialists Conference, 25th Annual IEEE PESC '94 Record.*, Taipei, Taiwan, Jun. 20–25, 1994, pp. 427–433.

Chuck Wong: "EMTP Modeling of IGBT Dynamic Performance for Power Dissipation Estimation", *Conference Record of the 1995 IEEE Industry Applications Conference*, 1995, Orlando, FL, Oct. 8–12, 1995, pp. 2656–2662.

* cited by examiner

OPEN-LOOP AND CLOSED-LOOP CONTROL METHOD FOR A THREE-POINT CONVERTER WITH ACTIVE CLAMPED SWITCHES, AND APPARATUS FOR THIS PURPOSE

CROSS-REFERENCE TO RELATED APPLICATION

This application is a continuation of copending International Application No. PCT/EP01/10141, filed Sep. 4, 2001, which designated the United States and was not published in English.

BACKGROUND OF THE INVENTION

1. Field of the Invention

The invention relates to an open-loop and closed-loop control method for a self-commutating three-point converter that is fed from a DC voltage intermediate circuit and has active clamped switches. Typically, such three-point converters have two series-connected main switches/inverse diodes between each DC voltage connection and each load connection, with the common junction point of the two inner main switches forming the load connection, and with an active clamped switch with an inverse diode being connected between each common junction point of an inner main switch and an outer main switch and the center tap of the DC voltage intermediate circuit, as a result of which two possible paths are formed for connecting a load connection to the center tap. The invention further relates to an apparatus for accomplishing the method. Converters such as these may be used both as self-commutated rectifiers and as self-commutated inverters. They are primarily used in medium-power and high-power electrical drives.

The topology of the self-commuted, diode-clamped three-point converter on the DC intermediate circuit (three-point NPC converter) is generally known. It is also used industrially for fields of application such as high-power industrial or traction drives (medium-voltage drives). In this case, insulated gate bipolar transistor (IGBT) modules with an integrated inverse diode are used as main switches. For reasons of modularity, simplification of the mechanical construction, or else in order to ensure that the blocking voltage is shared uniformly when semiconductor components are connected in series in converters such as these, IGBT modules are also frequently installed as NPC switches (referred to in the following text as active NPC switches or active neutral-point clamped switches, or active clamped switches) instead of neutral-point clamped diodes (NPC diodes). These IGBTs are in this case either placed in the "off" state by short-circuiting the gate-emitter path, or else are operated in the active range in order to control the blocking voltage distribution, while the integrated inverse diode carries out the function of the NPC diode.

Figure 1:
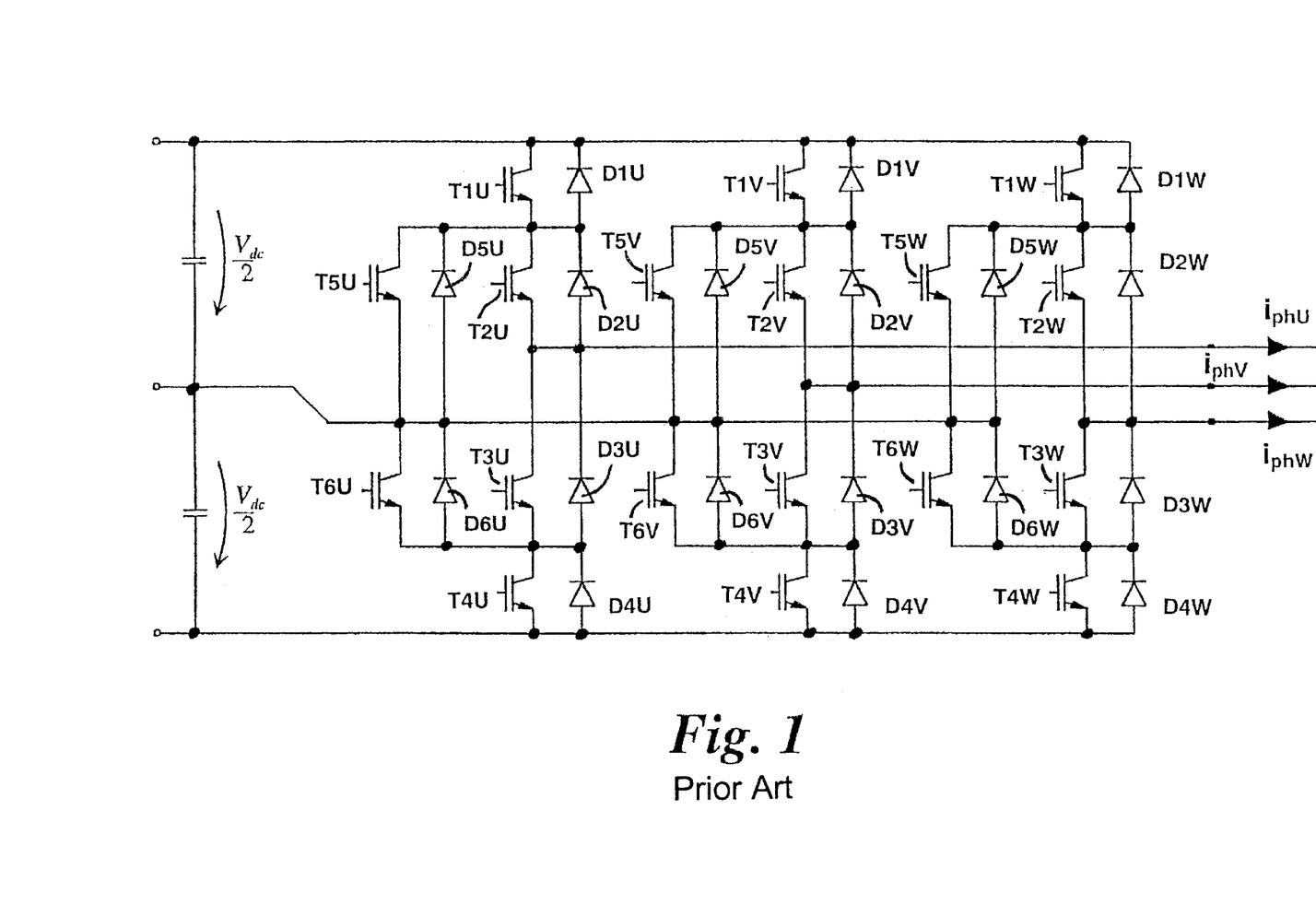
FIG. 1 is a circuit diagram showing a three-point NPC converter with active NPC switches according to the prior art.

FIG. 1 shows a generally known, self-commutated three-point converter, fitted with NPC switches, of this type on the DC intermediate circuit, or three-point NPC converter, for short. An outer main switch T1U, T1V, or T1W—referred to in general form by T1 in the following text—and an inner main switch T2U, T2V, or T2W—also referred to in general form in the following text as T2—are respectively connected in series between the positive DC voltage connection and the three load connections, with a respective inverse diode D1U, D1V, or D1W—also referred to in general form in the following text as D1—being connected back-to-back in parallel with each outer main switch T1U or T1V or T1W, respectively, and a respective inverse diode D2U, D2V, or D2W—also referred to in general form in the following text as D2—being connected back-to-back in parallel with each respective inner main switch T2U, T2V, or T2W.

A respective outer main switch T4U, T4V, or T4W—also referred to in general form in the following text as T4—and an inner respective main switch T3U, T3V, or T3W—also referred to in general form in the following text as T3—are connected in series between the negative DC voltage connection and the three load connections, with a respective inverse diode D4U, D4V, or D4W—also referred to in general form in the following text as D4—being connected back-to-back in parallel with each respective outer main switch T4U, T4V, or T4W, and a respective inverse diode D3U, D3V, or D3W—also referred to in general form in the following text as D3—being connected back-to-back in parallel with each respective inner main switch T3U, T3V, or T3W. The load-side phase currents (load currents) are annotated $i_{phU}$, $i_{phV}$, and $i_{phW}$.

The common junction point of T1U, D1U, T2U, and D2U is connected via an active NPC switch T5U with a back-to-back parallel-connected inverse diode D5U to the center tap of the DC intermediate circuit. The common junction point of T1V, D1V, T2V, and D2V is connected in the same way via an active NPC switch T5V with a back-to-back parallel-connected inverse diode D5V to the center tap of the DC intermediate circuit. In the same way, the common junction point of T1W, D1W, T2W, and D2W is connected via an active NPC switch T5W with a back-to-back parallel-connected inverse diode D5W to the center tap of the DC voltage intermediate circuit. The active NPC switches T5U, T5V, T5W are also referred to in general form in the following text as T5. The inverse diodes D5U, D5V, D5W are also referred to in the following text as D5.

The center tap is connected via two capacitors with the same capacitance to the two DC voltage connections. The voltage across each of the capacitors is $V_{dc}/2$ (half the intermediate circuit voltage).

The common junction point of T3U, D3U, T4U, and D4U is connected via an active NPC switch T6U with a back-to-back parallel-connected inverse diode D6U to the center tap of the DC voltage intermediate circuit. The common junction point of T3V, D3V, T4V, and D4V is connected in the same way via an active NPC switch T6V with a back-to-back parallel-connected inverse diode D6V to the center tap of the DC voltage intermediate circuit. In the same way, the common junction point of T3W, D3W, T4W, and D4W is connected via an active NPC switch T6W with a back-to-back parallel-connected inverse diode D6W to the center tap of the DC voltage intermediate circuit. The active NPC switches T6U, T6V, T6W are also referred to in general form in the following text as T6. The inverse diodes D6U, D6V, D6W are also referred to in the following text as D6.

An investigation into diode-clamped three-point NPC converters with sinusoidal modulation shows that the thermal configuration of these converters is governed by four critical operating points, which are quoted in the following Table I. At each of these four critical operating points, the phase current (load current) and hence the output power from the converter is limited by the maximum permissible losses in those power semiconductors which are most heavily loaded at this critical operating point. All the other semiconductors reach only a lower boundary layer temperature at the respective critical operating points. Since the maximum losses and the maximum boundary layer temperatures of the individual semiconductors reach comparable values at the operating points that are critical for them, all the components must be replaced by larger components if the output power of the converter is to be increased.

An additional critical operating point when using converters in electrical drive systems, particularly those with synchronous machines, is the starting or stopping of the drive. This situation is characterized by a very low output frequency from the converter, down to zero Hertz, and a low modulation level M. The phase current (load current) is in this case limited by the losses in the NPC diodes, which corresponds to case 2 in Table I below. Due to the low output frequency, one phase may be loaded with the peak value of the load current for a certain time period, this being sufficient to reach the thermally steady state. The achievable load current is thus reduced considerably in comparison to operation at high output frequencies. Although this problem can be minimized by reducing the switching frequency while stopping, a reduction in the load current with respect to the rated current whilst stopping cannot be avoided in conventional medium-voltage drives. Applications such as hot and cold rolling mills typically demand 200% load torque and hence twice the load current when the drive is being stopped, however. In consequence, satisfaction of this condition leads in a disadvantageous manner to considerable overdesign of the three-point NPC converter.

TABLE I

Critical operating points in the three-point converter

|  | Case 1 | Case 2 | Case 3 | Case 4 |
|---|---|---|---|---|
| Power factor | 1 (motor) | 1 (motor) | −1 (generator) | −1 (generator) |
| Modulation level M | 1.15 (maximum) | 0 (very small) | 1.15 (maximum) | 0 (very small) |
| Critical semi-conductor components | Outer main switches T1, T4, . . . | NPC diodes D5, D6, . . . | Inverse diodes of the outer main switches D1, D4, . . . | Inner main switches T2, T3, . . . |

With reference to what has been stated above, the non-uniform distribution of the losses between the individual semiconductor components is a major disadvantage of diode-clamped three-point NPC converters and of three-point converters that are operated like diode-clamped three-point NPC converters and have active NPC switches. This also means that the utilization level of the semiconductor components, in particular of the inner main switches, is relatively low. Furthermore, it should be stated that the capabilities of the active NPC switches (with inverse diodes), which are frequently installed instead of the NPC diodes, for influencing the distribution of the losses in the semiconductor components have so far not been actively made use of.

SUMMARY OF THE INVENTION

It is accordingly an object of the invention to provide an open-loop and closed-loop control method for a three-point converter with active clamped switches, and an apparatus for this purpose that overcome the hereinafore-mentioned disadvantages of the heretofore-known devices of this general type and that make the loss distribution between the semiconductor components of a phase module in the converter uniform at all operating points, even while stopping the drive.

With the foregoing and other objects in view, there is provided, in accordance with the invention, an open-loop and closed-loop control method. The method involves providing a three-point converter for connecting a DC voltage intermediate circuit having a positive DC voltage connection, a center tap, and a negative DC voltage to three load connections. The next step is, irrespective of a direction of a load current, connecting at least one of the two active clamped switches to the center tap together with at least one of the inner main switches for connecting to one of the load connections, in order to carry the current deliberately through at least one of the upper path and the lower path, to the center tap during a null state.

With the objects of the invention in view, there is also provided an open-loop and closed-loop control apparatus. The apparatus includes a three-point converter for connecting a DC voltage intermediate circuit having a positive DC voltage connection, a center tap, and a negative DC voltage to three load connections. The three-point converter includes two series-connected main switches/inverse diodes connected between each of the DC voltage connections and each of the load connections, and two inner main switches sharing a common junction point, the common junction point forming one of the load connections, and an active clamped switch with an inverse diode connected between each common junction point of an inner main switch and an outer main switch and the center tap to form an upper path and a lower path for connecting respective load connections to the center tap. The switches and diodes are semiconductors having phase currents and boundary layer temperatures. A modulator produces switching state commands. A temperature regulator and automatic drive device can form control signals for the semiconductor switches from the switching state commands of the modulator, the phase currents, and the boundary layer temperatures of the semiconductors.

The advantages that can be achieved by the invention are, in particular, making the loss distribution uniform between the NPC switches and the inner switches in cases 2 and 4 (motor or generator operation with a very low modulation level) according to Table I:

considerably reducing the complexity of semiconductors overall while maintaining the output power of the converter by using smaller semiconductors as inner main switches and active NPC switches or, alternatively, allowing the power to be reduced to a lesser extent while stopping, while keeping the installed switch rating constant.

Furthermore, the reduction in the load on the outer main switches and diodes at the critical operating points 1 and 3 (motor or generator operation with maximum modulation level) according to Table I above is achieved at the expense of the inner main switches and diodes and hence—associated with the likewise mentioned unification of the loss distribution between the NPC switches and the inner switches in cases 2 and 4—an increase in the output power of the converter (increase in the power yield) or an increase in the switching frequency is achieved without increased complexity in terms of semiconductor components.

Other features that are considered as characteristic for the invention are set forth in the appended claims.

Although the invention is illustrated and described herein as embodied in a open-loop and closed-loop control method for a three-point converter with active clamped switches, as well as an apparatus for this purpose, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In order to explain the method of operation of the open-loop and closed-loop control method according to the invention, the differences between the possible states in a conventional three-point NPC converter without active clamped switches or without active use of existing active clamped switches and a converter with active use of these NPC switches will be described first of all.

FIG. 1 shows the construction of a prior-art three-point converter with a voltage intermediate circuit with active NPC switches, as already explained initially. In order to modulate the output voltage, the connection of each phase on the AC voltage side is in each case connected to the positive intermediate circuit rail (positive DC voltage connection), to the neutral point (center tap) or to the negative intermediate circuit rail (negative DC voltage connection). These three states are referred to as "+" "0" and "−". In conventional three-point NPC converters, there is one, and only one, combination of switch positions for each of these three states, and these are summarized in Table II below. In the "0" state, current flows through the upper path of the center tap with a positive load current direction, and flows through the lower path in the negative direction. Both T2 and T3 are always switched on.

TABLE II

Switching states in the conventional three-point NPC converter (without use of the active clamped switches, prior art)

| | T1 | T2 | T3 | T4 |
|---|---|---|---|---|
| State "+" | 1 | 1 | 0 | 0 |
| State "0" | 0 | 1 | 1 | 0 |
| State "−" | 0 | 0 | 1 | 1 |

However, if the active NPC switches are used actively, there are a number of possible alternative switch positions to produce the "0" state. The load current can be passed through the upper path of the center tap in both directions by switching on T5 and T2, and can be passed through the lower path of the center tap by switching on T6 and T3. In the following text, these states are referred to as "0o2" (for the upper path) and "0u2" (for the lower path). When T5 and T2 are switched on (T3 and T6 are switched off and can each block half the intermediate circuit voltage), T4 can also remain in the switched-on state after commutation of "−" to "0o2". An analogous situation applies to the switch T1 after commutation from "+" to "0u2". These states are referred to in the following text as "0o1" (for the upper path) and "0u1" (for the lower path). Furthermore, the conventional state "0" can, of course, also be selected as in the above Table II and it is possible to switch T2, T3, T5, and T6 on at the same time. In this case, the way in which the current is shared between the upper and lower path of the center tap is governed by parasitic elements, by the scatter in the semiconductor characteristics, and by the temperature dependency of the semiconductor characteristics (for example the forward voltage). Neither of the two last-mentioned switching states will be dealt with any further.

There are no alternatives for the "+" and the "−" states by active use of the active NPC switches. The total of six switching states that are thus available are summarized in Table III below.

TABLE III

Switching states in the three-point converter using the active NPC switches

| | T1 | T2 | T3 | T4 | T5 | T6 |
|---|---|---|---|---|---|---|
| State "+" | 1 | 1 | 0 | 0 | 0 | 1 |
| State "0o2" | 0 | 1 | 0 | 0 | 1 | 0 |
| State "0o1" | 0 | 1 | 0 | 1 | 1 | 0 |
| State "0u1" | 1 | 0 | 1 | 0 | 0 | 1 |
| State "0u2" | 0 | 0 | 1 | 0 | 0 | 1 |
| State "−" | 0 | 0 | 1 | 1 | 1 | 0 |

It is obviously possible to influence the distribution of the conduction losses during the "0" state by deliberate selection of the upper or lower NPC path. In contrast, the conduction losses cannot be influenced in the "+" and "−" states. The commutation operations to or from the new states govern the distribution of the switching losses in all the semiconductors.

All the commutation operations take place between two components. Even when a number of switches are being switched, significant losses only ever occur in one active switch and one inverse diode. The other switches in principle switch without any losses since they either are not carrying any current or do not have to withstand any reverse voltage before and after the commutation operation.

The four types of commutation operations in the proposed open-loop control method for conventional commutation in the three-point NPC converter are compared, and their influence on the distribution of the losses is explained, in the following text. By way of example, a positive load current and the modulation of a positive output voltage are considered in this case. The bridge arm is switched backwards and forwards between the positive DC voltage rail ("+" state) and the center tap (neutral state or "0").

Figure 2:
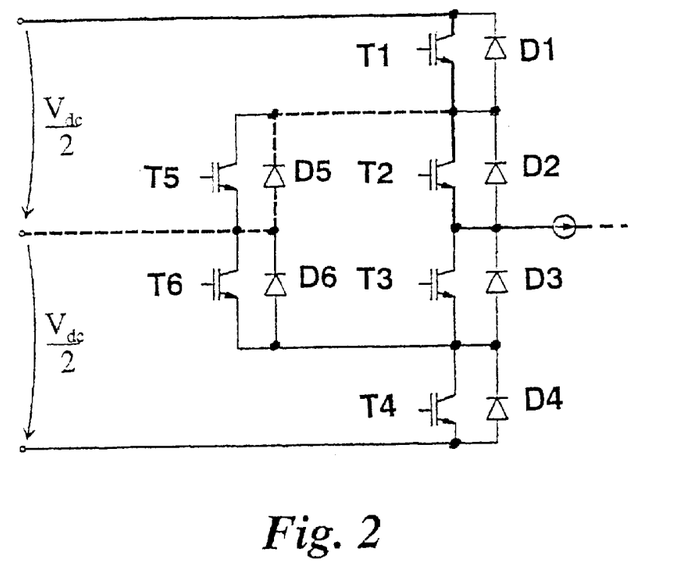
FIGS. 2 and 3 are circuit diagrams showing current profiles of interest during commutation operations.

The conventional commutation operation "+"⇌"0" will be considered first of all in the following text. Without active inclusion of the active NPC switches, the load current commutates between T1 and D5. The outer main switch T1 and the inner main switch T3 are switched on and off alternately, while T2 and T4 remain in the on state and in the off state, respectively. Switching losses occur in T1 and D5 (in this context, see also FIG. 2).

The following text considers the commutation process "+"⇌"0o2" proposed according to the invention, in which the NPC switches are actively included. The load current is deliberately commutated on the upper path of the center tap, to be precise irrespective of the current direction. This is done firstly by opening T6 (switched off), which is preferably switched on in the "+" state. T1 is then switched off and, taking account of the required dead time, the clamped switch T5 is switched on, that is to say once the current commutation process has been completed. The inverse switching processes take place in the reverse sequence during commutation back to "+". Switching losses occur in both T1 and D5, as during conventional commutation (see FIG. 2).

Figure 3:
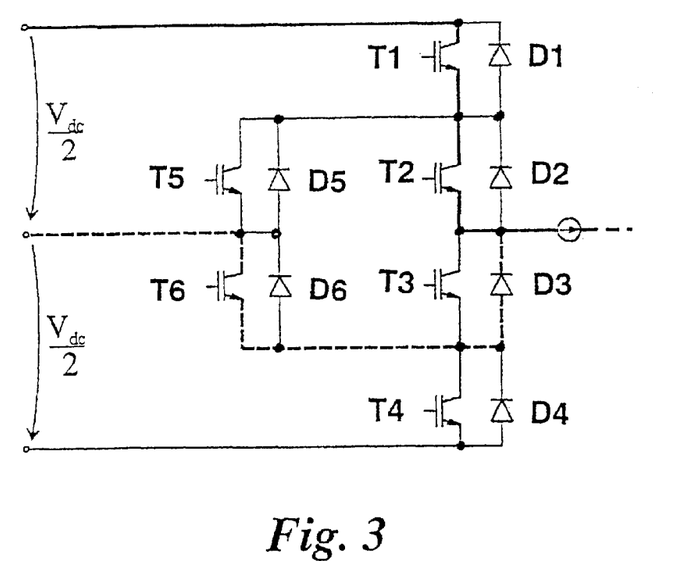

The following text considers the commutation process "+"⇌"0u2". The load current is deliberately commutated onto the lower path of the center tap, irrespective of the current direction, by first of all switching T1 off and, taking account of the dead time, switching the inner main switch T3 on, after which T2 is also opened. Initially, the load current is distributed between the upper path and the lower path of the center tap. When T2 is opened, the current in the upper path is likewise commutated onto the lower path, which is already carrying current. During the reverse commutation process, T2 is closed first, and T3 is then opened. When T1 is switched on, the entire load current is commutated from the lower path of the center tap back to the "+" path. Significant switching losses occur in T1 and D3 (see FIG. 3).

The following text considers the commutation process "+"⇌"0u1". As in the commutation process "+"⇌"0u2" described above, the load current is deliberately commutated onto the lower path of the center tap, irrespective of the current direction. However, the commutation process is achieved by switching T2 off. After the dead time, T3 is switched on, and T1 remains switched on. The inverse switching processes take place in the reverse sequence during commutation back to "+". Switching losses occur in both T2 and D3 (see FIG. 3).

The use of the commutation process "+"⇌"0u2" makes it possible to move the switching losses from the NPC diode D5 to the inner inverse diode D3, in comparison to the commutation process "+"⇌"0o2" and the conventional commutation process. The use of the commutation process "+"⇌"0u1" also makes it possible to move the switching losses from the outer switch T1 to the inner switch T2.

The following text considers the commutation process "+"⇌"0o1". This commutation process is equivalent to the commutation process "+"⇌"0o2", and is used only in the direction "0o1"→"+", if the bridge arm is in the state "0o1" after previous modulation of a negative output voltage, and the state "+" is then created. This is done by firstly opening T4, after which the process continues as from the commutation process "0o2"→"+". Switching losses occur in T1 and D5.

Figure 4:
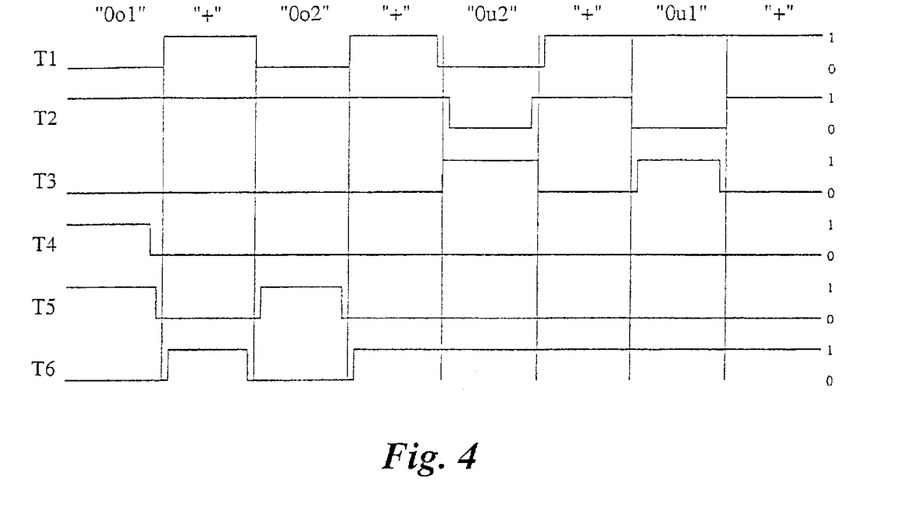
FIG. 4 shows switching signals for the commutation operations during modulation of a positive output voltage.
Figure 5:
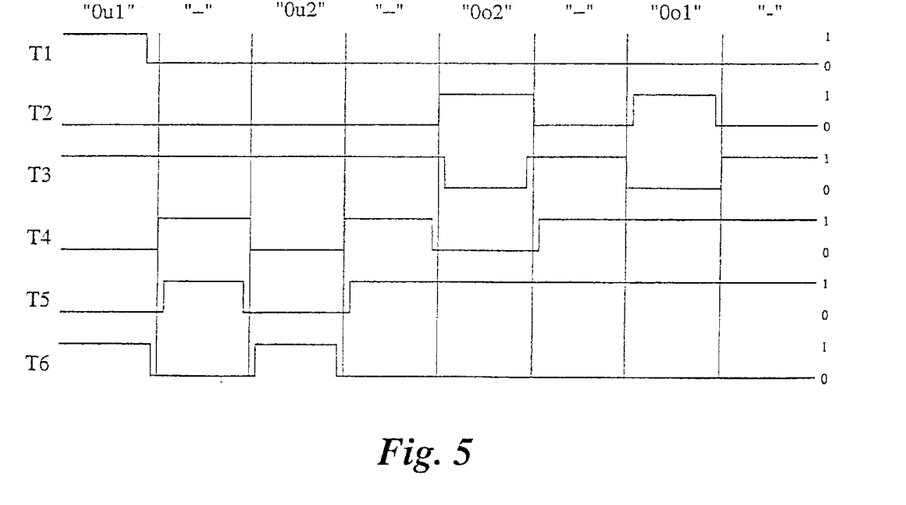
FIG. 5 shows switching signals for the commutation operations during modulation of a negative output voltage.

The commutation processes between the state "−" and the various null states are equivalent to the commutation processes described above. When the load current is negative, the losses occur in each of the back-to-back parallel-connected semiconductors, in contrast to the situation when the load current is positive. Table IV below indicates the lossy semiconductors for all the commutation processes. The switching signals to be supplied to the semiconductor switches for the commutation operations for modulation of a positive output voltage are shown in FIG. 4, while FIG. 5 shows the switching signals to be supplied to the semiconductor switches for modulation of a negative output voltage.

TABLE IV

Switching losses for commutation processes in the three-point converter with active use of the active NPC switches

| | T1 | D1 | T2 | D2 | T3 | D3 | T4 | D4 | T5 | D5 | T6 | D6 |
|---|---|---|---|---|---|---|---|---|---|---|---|---|
| Positive load current | | | | | | | | | | | | |
| "+" ↔ "0o2" | X | | | | | | | | | X | | |
| "+" ↔ "0o1" | X | | | | | | | | | X | | |
| "+" ↔ "0u1" | | | X | | | X | | | | | | |
| "+" ↔ "0u2" | X | | | | | X | | | | | | |
| "0o2" ↔ "−" | | | X | | | X | | | X | | | |
| "0o1" ↔ "−" | | | X | | | X | | | | | | |
| "0u1" ↔ "−" | | | | | | | | | X | | | X |
| "0u2" ↔ "−" | | | | | | | | | X | | | X |
| Negative load current | | | | | | | | | | | | |
| "+" ↔ "0o2" | | X | | | | | | | X | | | |
| "+" ↔ "0o1" | | X | | | | | | | X | | | |
| "+" ↔ "0u1" | | | | | X | X | | | | | | |
| "+" ↔ "0u2" | | X | | | | X | | | | | | |
| "0o2" ↔ "−" | | | | | X | | X | | | | | |
| "0o1" ↔ "−" | | | | | X | X | | | | | | |
| "0u1" ↔ "−" | | | | | | | | X | | | | X |
| "0u2" ↔ "−" | | | | | | | | X | | | | X |

The deliberate use of all the commutation processes described above makes it possible to ensure that the losses (and hence the boundary layer temperatures) in each of two switch groups become similar to one another. When the outer semiconductor components are subject to the maximum load with a high modulation level (cases 1 and 3 in Table I above), the boundary layer temperatures of the outer and inner semiconductors and main switches are made similar to one another by suitable choice of the null states. The boundary layer temperature of the NPC switches is in this case at a low level. When the NPC diodes or the inner semiconductor switches are subjected to the maximum load with a low modulation level (cases 2 and 4 in Table I above), the boundary layer temperatures of the NPC semiconductors and of the inner semiconductors are made similar to one another by suitable choice of the null states. In this case, the boundary layer temperature of the outer semiconductors and main switches is at a relatively low level.

The function explained above is achieved by closed-loop control of the boundary layer temperature of the semiconductor components and by an open-loop and closed-loop control system which continuously determines the losses and, from them, the boundary layer temperatures of all the semiconductor components, selects suitable switching states ("0o2", "0o1 ", "0u1", or "0u2") from the switching commands from the higher-level converter closed-loop control system (PWM, DTC) and from the information about the boundary layer temperatures, and, from this, generates the necessary drive signals for the semiconductor switches. The open-loop control system with the active inclusion of the active clamped switches is just one additional component for conventional open-loop control of the three-point converter and, of course, does not replace the modulator for pulse width modulation (PWM) or the regulator for direct closed-loop control.

Figure 6:
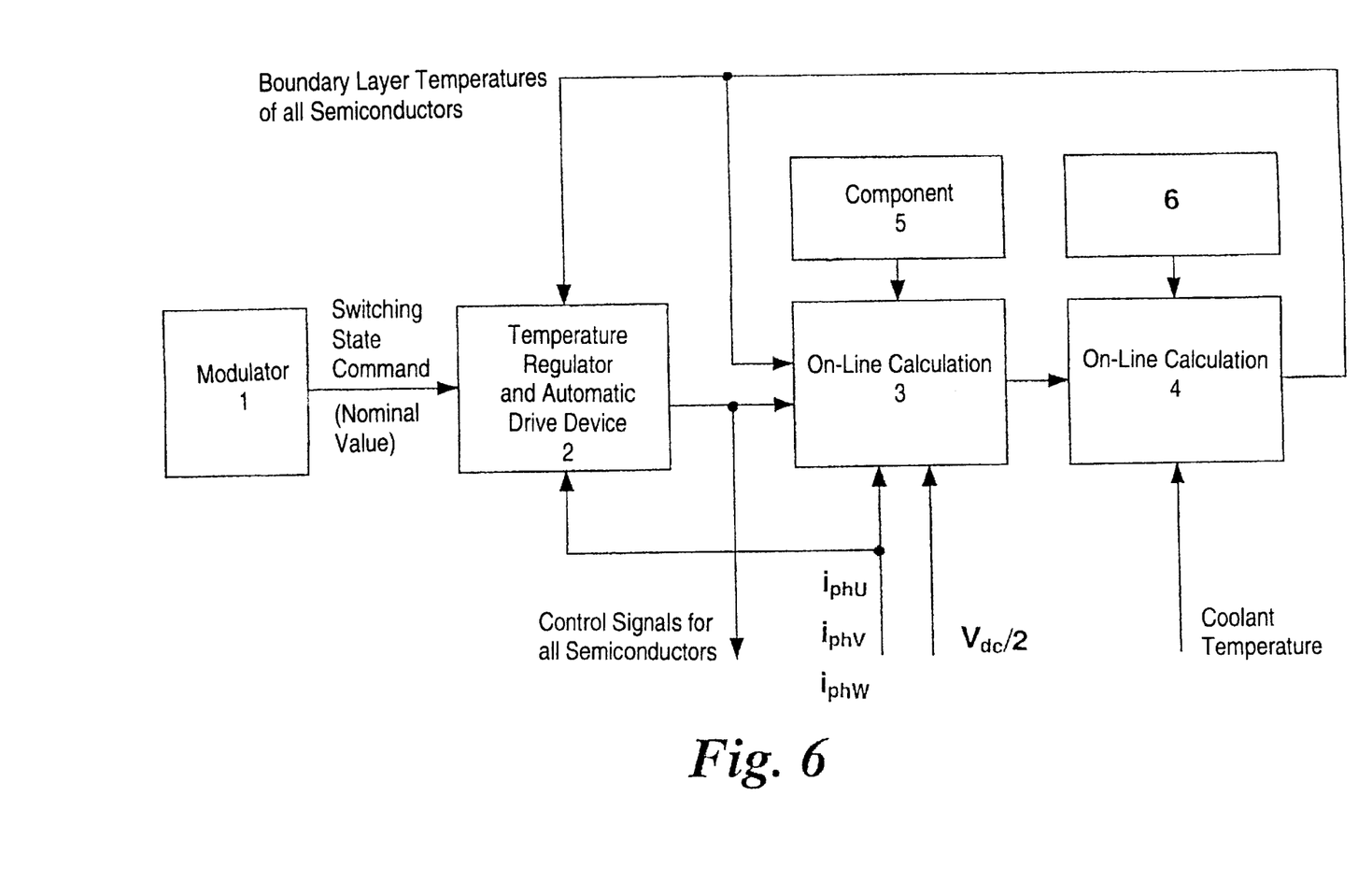
FIG. 6 is a block diagram of an additional component for conventional open-loop/closed-loop control of a three-point NPC converter.

FIG. 6 shows a block diagram of the proposed system. A modulator 1 (PWM, that is to say Pulse Width Modulation, or DTC, that is to say direct torque control) supplies switching state commands (nominal values) to a temperature regulator and automatic drive device 2. This temperature regulator and automatic drive device 2 is provided with boundary layer temperatures of all the semiconductors, and with the load currents $i_{phU}$, $i_{phV}$, and $i_{phW}$. In this case, commutation processes and null states are selected in the temperature regulator in order to achieve an optimum distribution of the boundary layer temperatures of the semiconductors. The automatic drive device, in this case, produces the output of the necessary drive signals for all the semiconductor switches, taking into account the switching sequence during the commutation processes.

On the output side, the temperature regulator and automatic drive device 2 emits control signals for all the semiconductor switches (outer main switches, inner main switches, NPC switches). These control signals are also passed to one input of an on-line calculation 3 of the switching and induction losses. The input side of the on-line calculation 3 is also supplied with the boundary layer temperatures of all the semiconductors, with the intermediate circuit voltage $V_{dc}/2$, with the load currents $i_{phU}$, $i_{phV}$, $i_{phW}$, and with signals from a component 5 in which semiconductor loss approximations are stored.

The output signal from the on-line calculation 3 is passed to an on-line calculation 4. The on-line calculation calculates the boundary layer temperatures of all the semiconductors and, on its input side, receives the coolant temperature, at that time, of the semiconductors, and signals from a thermal converter model 6. The output side of the on-line calculation 4 emits the boundary layer temperatures of all the semiconductors.

By way of example, Table V below illustrates a method that is suitable for choosing the commutation processes. This is suitable for use not only with PWM but also with direct closed-loop control methods such as direct torque control (DTC) or direct self-regulation (DSR). This ensures that that semiconductor which has the highest boundary layer temperature at any given time is never loaded with switching losses during the next commutation process. The conduction losses of the semiconductors are ignored in this selection method. Normally, when the conduction losses on their own do not lead to a semiconductor being heated to the maximum boundary layer temperature, this method ensures that the boundary layer temperatures are distributed as uniformly as possible.

TABLE V

Decision table for commutation processes in the null state

| Modulation | Load current | | Boundary layer Temperatures $\phi_1$ | | Null state |
|---|---|---|---|---|---|
| Positive voltage (+ → 0) | Load current >0 | T1 > T2 | D5 > D3 | | "0u1" |
| | | | D5 > D3 | T1 > D3 | "0u1" |
| | | | | T1 < D3 | "0o2" |
| | | T1 < T2 | D5 > D3 | | "0u2" |
| | | | D5 < D3 | | "0o2" |
| | Load current <0 | D1 > D2 | T5 > T3 | | "0u1" |
| | | | T5 < T3 | D1 > T3 | "0u1" |
| | | | | D1 < T3 | "0o2" |
| | | D1 < D2 | T5 > T3 | | "0u2" |
| | | | T5 < T3 | | "0o2" |
| Negative voltage (− → 0) | Load Current >0 | T2 > T6 | D4 > D3 | T2 > D4 | "0u2" |
| | | | | T2 < D4 | "0o1" |
| | | | D4 < D3 | | "0u2" |
| | | T2 < T6 | D4 > D3 | | "0o1" |
| | | | D4 < D3 | | "0o2" |

TABLE V-continued

Decision table for commutation processes in the null state

| Modulation | Load current | | Boundary layer Temperatures $\phi_1$ | | Null state |
|---|---|---|---|---|---|
| | Load current <0 | D2 > D6 | T4 > T3 | D2 > T4 | "0u2" |
| | | | | D2 < T4 | "0o1" |
| | | | T4 < T3 | | "0u2" |
| | | D2 < D6 | T4 > T3 | | "0o1" |
| | | | T4 < T3 | | "0o2" |

The method described above is improved by including in the calculation the semiconductor power losses to be expected during steady-state operation in the next null state. When used in PMW, the duration of the next null state is known, and when used with a direct closed-loop control method, such as DTC, its duration can be calculated in advance from the machine model. The type of commutation to the null state can thus be chosen such that the highest boundary layer temperature that occurs in a semiconductor is a minimum after the commutation process and the subsequent null state.

The proposed open-loop control method results in major advantages in circuits in which the semiconductors are operating at the limit of their thermal power capability but are able to switch higher currents on and off than is generally the case with IGBTs for example. The method then achieves an improvement in the output power of the converter without any increased complexity in terms of semiconductor components. If the active NPC switches are already installed, for example as IGBT modules, but are not used actively, the method is particularly appropriate. However, the method is also worthwhile for converters in which the active NPC switches need to be installed as additional items, since this additional complexity is small in comparison to the achievable improvement in the output power of the converter. If the semiconductors being used are already operating at the limit of their maximum permissible switch-off current, so that it is impossible to increase the output power, the use of the proposed open-loop control method makes it possible to increase the switching frequency of the converter without increasing the semiconductor element complexity. The second aim, of reducing the required power reduction for low fundamental frequencies, is likewise ensured.

It can be seen from Table III, which has been described above, that the NPC switches are switched on whenever (in conventional three-point NPC converters without NPC switches) the corresponding NPC diodes are clamping the voltage across the outer switches to $V_{dc}/2$, that is to say whenever T6 is switched on in the "+" state and T5 is switched on in the "−" state. In contrast to conventional three-point NPC converters without actively used NPC switches, the voltage is thus distributed uniformly between T3 and T4 in the "+" state, and between T1 and T2 in the "−" state, irrespective of the distribution of the leakage currents of the semiconductors, and without any additional passive balancing resistors. A further advantage of the method is thus the saving of passive components and of balancing losses.

The proposed method and the open-loop control apparatus can be implemented in all modern three-point NPC converters with active NPC switches, in which all the active switches are in the form of semiconductor components which can be switched off, for example IGBTs, IGCTs, MCTs, MTOs, MOSFETs or silicon-carbide (SiC) components, such as medium-voltage converters for industrial applications, traction or HVDC lighting.

We claim:

1. An open-loop and closed-loop control method, which comprises:

providing a three-point converter for connecting a DC voltage intermediate circuit having a positive DC voltage connection, a center tap, and a negative DC voltage connection, to three load connections, the three-point converter having:
two series-connected main switches/inverse diodes connected between each of the DC voltage connections and each of the load connections, and
two inner main switches sharing a common junction point, the common junction point forming one of the load connections,
an active clamped switch with an inverse diode connected between each common junction point of an inner main switch and an outer main switch and the center tap to form an upper path and a lower path for connecting respective load connections to the center tap; and irrespective of a direction of a load current, connecting at least one of the two active clamped switches to the center tap together with at least one of the inner main switches for connecting to one of the load connections, in order to carry the current deliberately through at least one of the upper path and the lower path, to the center tap during a null state.

2. The method according to claim 1, wherein the three-point converter is a single-phase three-point converter.

3. The method according to claim 1, wherein the three-point converter is a polyphase three-point converter.

4. The method according to claim 1, which further comprises, irrespective of the direction of the load current, connecting at least one of the two active clamped switches to the center tap together with at least one of the inner main switches to form a load connection for carrying current deliberately through both the upper path and the lower path, to the center tap during the null state.

5. The open-loop and closed-loop control method according to claim 1, which further comprises commutating one of the outer, positive or negative, DC voltage connections to the center tap by:
initially switching off the outer main switch connected directly to the one of the outer DC voltage connections, the outer main switch lying in a given bridge half, and
connecting a one of the clamped switches in the given bridge half after a dead time.

6. The open-loop and closed-loop control method according to claim 1, which further comprises commutating one of the outer, positive or negative, DC voltage connections to the center tap by:
initially switching off the outer main switch connected directly to the one of the outer DC voltage connections and lying in a first bridge half,
switching on the inner main switch in a second bridge half after a dead time, and
switching off the inner main switch located in the first bridge half after a further dead time.

7. The open-loop and closed-loop control method according to claim 1, which further comprises commutating one of the outer, positive or negative, DC voltage connections to the center tap by:
initially switching off the inner main switch connected to the one of the outer DC voltage connections via one of the outer main switches, the one of the main switches lying in a first bridge half, and
switching on the inner main switch in a second bridge half after a dead time.

8. The open-loop and closed-loop control method according to claim 1, which further comprises:
using semiconductors to form the switches and diodes; and
switching on the active clamped switches as a function of an instantaneous thermal load on the semiconductors.

9. The open-loop and closed-loop control method according to claim 8, which further comprises switching on the active clamped switches such a one of the semiconductors with an instantaneously highest boundary layer temperature is never loaded with switching losses during subsequent commutation.

10. The open-loop and closed-loop control method according to claim 9, which further comprises accounting for the instantaneous thermal load on the semiconductors by forming control signals for the semiconductor switches from switching state commands of a higher-level converter closed-loop control system, phase currents, and boundary layer temperatures of the semiconductors.

11. The open-loop and closed-loop control method according to claim 10, which further comprises:
comparing with each other the boundary layer temperatures of those semiconductors loadable with switching losses as a function of a voltage to be modulated and a direction of a load current during a next commutation to the null state; and
selecting a next null state by not loading a one of the compared semiconductors having a highest boundary layer temperature with switching losses during the next commutation.

12. The open-loop and closed-loop control method according to claim 10, which further comprises calculating online switching and conduction losses as a function of the control signals, of an intermediate-circuit voltage, the phase currents, the boundary layer temperatures, and loss approximations of the semiconductors.

13. The open-loop and closed-loop control method according to claim 12, which further comprises calculating online the boundary layer temperatures as a function of switching and conduction losses, a coolant temperature, and a thermal converter model.

14. An open-loop and closed-loop control apparatus, comprising:
a three-point converter for connecting a DC voltage intermediate circuit having a positive DC voltage connection, a center tap, and a negative DC voltage connection, to three load connections, the three-point converter including:
two series-connected main switches/inverse diodes connected between each of the DC voltage connections and each of the load connections, and
two inner main switches sharing a common junction point, the common junction point forming one of the load connections, and
an active clamped switch with an inverse diode connected between each common junction point of an inner main switch and an outer main switch and the center tap to form an upper path and a lower path for connecting respective load connections to the center tap,
said switches and diodes being semiconductors having phase currents and boundary layer temperatures; and a modulator producing switching state commands; and a temperature regulator and automatic drive device for forming control signals for the semiconductor switches from the switching state commands of said modulator, the phase currents, and the boundary layer temperatures of said semiconductors.

15. The open-loop and closed-loop control apparatus according to claim 14, wherein the three-point converter is a single-phase three-point converter.

16. The open-loop and closed-loop control apparatus according to claim 14, wherein the three-point converter is a polyphase three-point converter.

17. The open-loop and closed-loop control apparatus according to claim 14, further comprising:

a component for storing semiconductor loss approximations and emitting stored semiconductor loss approximations as signals; and an online calculation having an input side and an output side and receiving, on said input side, the control signals for said semiconductor switches, the boundary layer temperatures of said semiconductors, the phase currents, an intermediate-circuit voltage, and the signals from said component, and emitting calculated switching and conduction losses on said output side.

18. The open-loop and closed-loop control apparatus according to claim 17, further comprising:

a thermal converter model emitting signals; and a further online calculation having an input side and an output side, receiving, on said input side, signals from said online calculation, a coolant temperature, and the signals from a thermal converter model, and emitting the boundary layer temperatures of said semiconductors on said output side.

* * * * *